(12) United States Patent
Sheldrake

(10) Patent No.: US 7,946,312 B2
(45) Date of Patent: May 24, 2011

(54) FLEXIBLE PIPE

(75) Inventor: Terence Sheldrake, Sunderland (GB)

(73) Assignee: Wellstream International Limited, Newcastle-Upon-Tyne (GB)

( * ) Notice: Subject to any disclaimer, the term of this patent is extended or adjusted under 35 U.S.C. 154(b) by 0 days.

(21) Appl. No.: 12/215,549

(22) Filed: Jun. 27, 2008

(65) Prior Publication Data

US 2009/0000683 A1   Jan. 1, 2009

(30) Foreign Application Priority Data

Jun. 28, 2007   (GB) .................................. 0712586.7

(51) Int. Cl.
*F16L 11/00*   (2006.01)
(52) U.S. Cl. ......... 138/134; 138/129; 138/130; 138/133

(58) Field of Classification Search .................. 138/134, 138/135, 129, 130, 133, 150
See application file for complete search history.

(56) References Cited

U.S. PATENT DOCUMENTS

| | | | | | |
|---|---|---|---|---|---|
| 3,966,388 | A | * | 6/1976 | Bonavent et al. | 425/505 |
| 4,013,100 | A | * | 3/1977 | Thiery et al. | 138/129 |
| 5,269,349 | A | * | 12/1993 | Sugier et al. | 138/172 |
| 5,406,984 | A | * | 4/1995 | Sugier et al. | 138/135 |
| 5,730,188 | A | * | 3/1998 | Kalman et al. | 138/135 |
| 6,098,667 | A | * | 8/2000 | Odru | 138/134 |
| 6,253,793 | B1 | * | 7/2001 | Dupoiron et al. | 138/135 |
| 6,978,806 | B2 | * | 12/2005 | Glejbol et al. | 138/134 |

* cited by examiner

*Primary Examiner* — Patrick F Brinson
(74) *Attorney, Agent, or Firm* — Klarquist Sparkman, LLP

(57) ABSTRACT

Apparatus and methods are disclosed relating to flexible pipe and composite tape. Flexible pipe body for a flexible pipe comprises an internal pressure sheath and at least one armour layer over the sheath comprising a wound tape of composite material. A method for manufacturing a composite tape is disclosed making use of a pultrusion process.

22 Claims, 5 Drawing Sheets

FLEXIBLE PIPE

CROSS REFERENCE TO RELATED APPLICATION

The present application claims priority to Great Britain Patent Application No. GB0712586.7, filed Jun. 28, 2007, which is incorporated herein by reference.

FIELD

The present invention relates to flexible pipe body which can be used to form flexible pipe of the type suitable for transportation of water, gas, mineral oil, crude oil or similar production fluids. In particular, but not exclusively, the present invention relates to flexible pipe body having one or more armour layers formed from wound tape of a composite material.

BACKGROUND

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a pipe body and one or more end fittings. The pipe body is typically formed as a combination of layered materials that form a fluid and pressure-containing conduit. The pipe structure allows large deflections without causing bending stresses and strains that impair the pipe's functionality over its lifetime. The pipe body is generally built up as a structure including metallic and polymer layers.

In many known flexible pipe designs the pipe includes one or more pressure armour layers. The primary load on such layers is formed from radial forces. Pressure armour layers tend to be wound with a large angle in relation to the longitudinal axis of flexible pipe body and often have a specific cross section profile to interlock so as to be able to maintain and absorb radial forces resulting from outer or inner pressure on the pipe. The cross sectional profile of the wound tapes which thus prevent the pipe from collapsing or bursting as a result of pressure are sometimes called pressure-resistant profiles.

In many known flexible pipe designs the pipe includes one or more tensile armour layers. The primary load on such a layer is tension. In high pressure applications, such as in deep water and ultra deep water environments, the tensile armour layer experiences high tension loads from the internal pressure end cap load as well as weight. This can cause failure in the flexible pipe since such conditions are experienced over prolonged periods of time.

Unbonded flexible pipe has been an enabler for deep water (less than 3,300 feet (1,005.84 meters)) and ultra deep water (greater than 3,300 feet) developments for over 15 years. The technology enabled the industry to initially produce in deep water in the early 90's and then to ultra deep waters up to around 6,500 feet (1,981.2 meters) in the late 90's. Water depths greater than 6,500 feet push the envelope where typical free-hanging riser configurations and flexible pipe in general can operate. It is the increasing demand for oil which is causing exploration to occur at greater and greater depths where environmental factors are more extreme. For example in such deep and ultra-deep water environments ocean floor temperature increases the risk of production fluids cooling to a temperature which may lead to pipe blockage. Increased depths also increase the pressure associated with the environment in which the flexible pipe must operate. As a result the need for high levels of performance from the pressure armour and tensile armour layers of the flexible pipe body is increased.

One way to improve the strength and thus performance of armour layers is to make the layers from thicker and stronger and thus more robust materials. For example for pressure armour layers in which the layers are often formed from wound tape with adjacent windings in the layer interlocking, manufacturing the tape from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably which is also a disadvantage.

SUMMARY

It is an aim of the certain disclosed embodiments to at least partly mitigate the above-mentioned problems.

It is an aim of certain disclosed embodiments to provide flexible pipe body which can be used in flexible pipe of a type able to transport production fluids and which includes a pressure armour layer or tensile armour layer or pressure and tensile armour layers which are able to operate effectively at great depths.

It is an aim of certain disclosed embodiments to provide flexible pipe body which can be used in flexible pipe of a type to transport fluids and which include an armour layer made in such a way to be relatively light and yet strong enough to perform according to desired parameters.

It is an aim of certain disclosed embodiments to provide layers in flexible pipe body which can flex as the flexible pipe bends and yet which is strong enough to resist burst-through of an underlying internal pressure sheath such as a barrier layer or liner.

It is an aim of certain disclosed embodiments to provide a riser assembly, flow line or jumper and method of manufacturing a flexible pipe able to operate in deep and ultra-deep water environments.

According to a first aspect of the disclosed technology there is provided flexible pipe body for a flexible pipe, comprising:

an internal pressure sheath;

at least one armour layer over the sheath comprising a wound tape of composite material.

According to a second aspect of the disclosed technology there is provided a method of manufacturing flexible pipe body, comprising the steps of:

winding at least one armour layer over an internal pressure sheath by winding a tape of composite material over the sheath.

According to a third aspect of the disclosed technology there is provided a method of manufacturing a composite tape via a pultrusion process, comprising the steps of:

providing a plurality of reinforcement fibres:

impregnating the fibres with a resin mixture:

heating the fibres and resin in a die:

continually pulling fibres through the die.

Certain embodiments of the disclosed technology provide flexible pipe body in which at least one armour layer over a fluid retaining layer is formed from a wound tape of composite material. The composite material provides high strength but at a controlled mass. For deep sea operation where weight is a problem the matrix of the composite material can be selected to be relatively light. For operation where weight of flexible pipe is not a critical design parameter the matrix of the composite material from which the armour layer is manufactured may be formed from a selected heavy material which provides high strength and thus performance but produces a relatively heavy flexible pipe.

Certain embodiments of the disclosed technology provide an armour layer in which reinforcement fibres can be located and/or shaped and/or manufactured from different materials so as to determine performance characteristics of the wound tape in use. For example at particular areas of the tape where high stress is to be expected when adjacent windings are interlocked, a greater concentration of reinforcement fibres may be provided. Alternatively a lesser or greater concentration of reinforcement fibres can be provided close to an outer surface of the tape.

Certain embodiments of the disclosed technology provide that portions of adjacent windings of an armour layer may be fused together by heating a matrix material of the composite tape past a predetermined temperature. Fusing together adjacent windings into an integral form can increase overall strength. In order to provide flexibility of an armour layer provided in this fused way weaknesses, such as narrowed neck regions, can be formed in the cross section of the tape which is wound around the armour layer. Flexing about the narrowed neck region can thus occur when the flexible pipe body needs to bend.

Certain embodiments of the disclosed technology provide an armour layer formed of interlocked windings in which a further composite tape can be wound radially outside the interlocked armour layer. This improves overall performance. The further reinforcement tape may be fused to the interlocked armour layer so as to improve overall performance.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
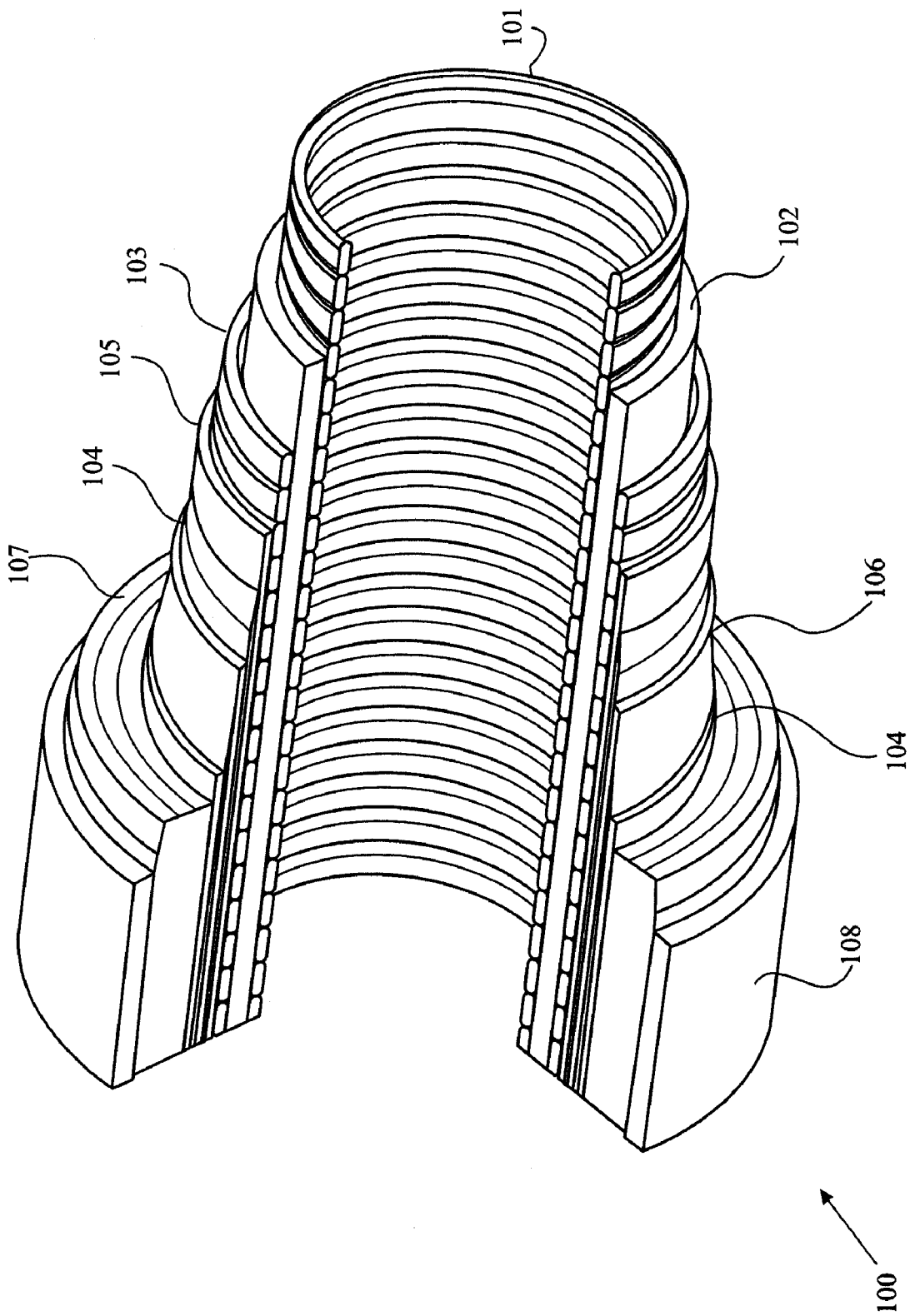
FIG. 1 illustrates a flexible pipe body.

Throughout this specification reference will be made to a flexible pipe. It will be understood that a flexible pipe is an assembly of a portion of flexible pipe body and one or more end fittings in each of which an end of the pipe body is terminated. FIG. 1 illustrates how a pipe body 100 is formed in accordance with an embodiment of the present invention from a composite of layered materials that form a pressure-containing conduit. Although a number of particular layers are illustrated in FIG. 1, it is to be understood that the present invention is broadly applicable to coaxial pipe body structures including two or more layers.

As illustrated in FIG. 1, a pipe body typically includes an innermost carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads. It will however be appreciated that embodiments of the present invention are applicable to 'smooth bore' as well as such 'rough bore' applications.

The internal pressure sheath 102 acts as a fluid retaining layer and typically comprises a polymer layer that ensures internal-fluid integrity. It is to be understood that this internal pressure sheath may itself comprise a number of sub-layers. It will be appreciated that when a carcass layer is utilised the retaining layer is often referred to as a barrier layer. In operation without such a carcass (so-called smooth bore operation) the fluid retaining layer may often be referred to as a liner.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction. The pressure armour layer is described in more detail hereinafter.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes an outer sheath 108 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
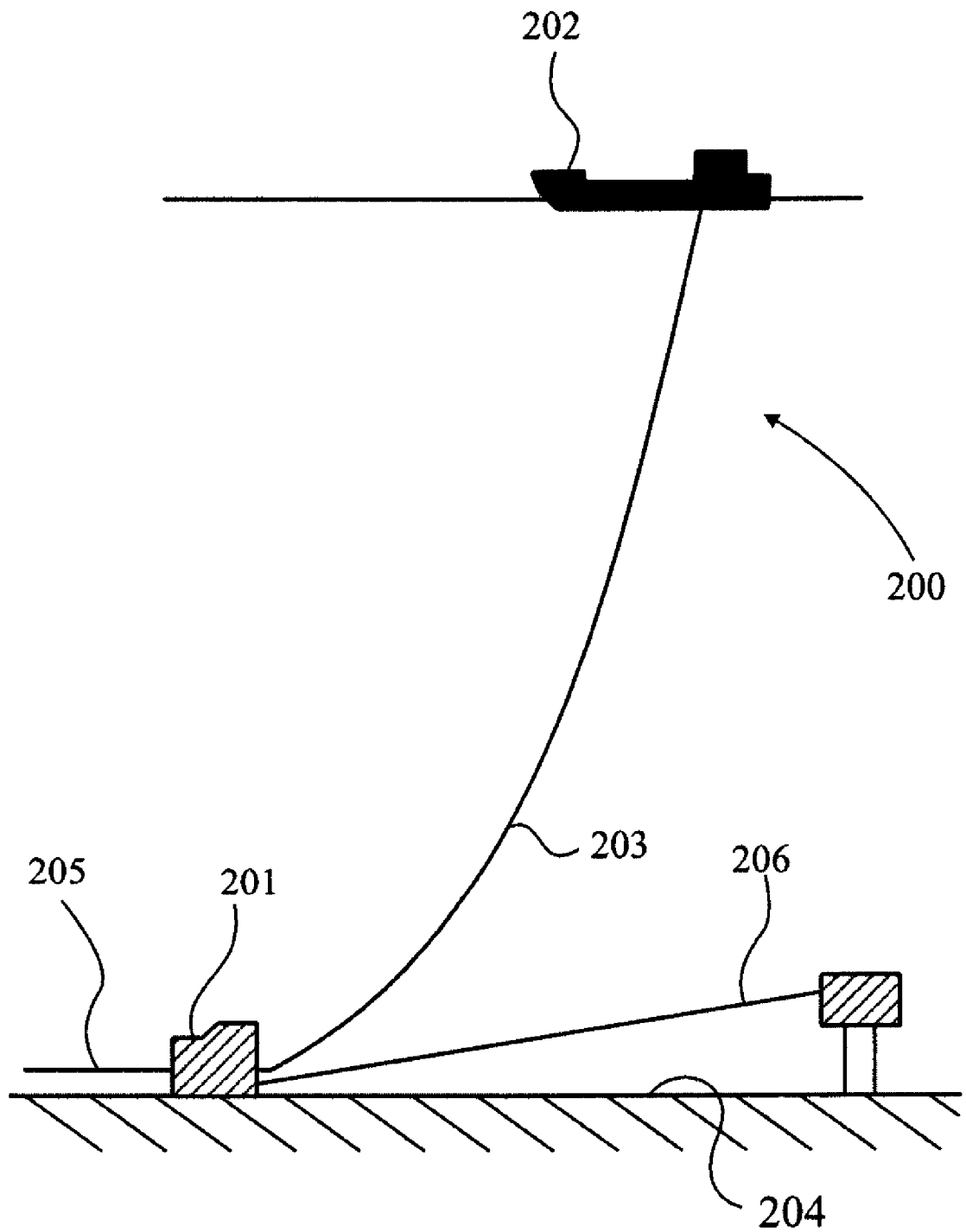
FIG. 2 illustrates a catenary riser.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation. The riser may be in segments with end fittings and be of hybrid structures optimising either tension or collapse depending on the depth.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe body can be utilised as a flowline 205 or jumper 206.

Figure 3:
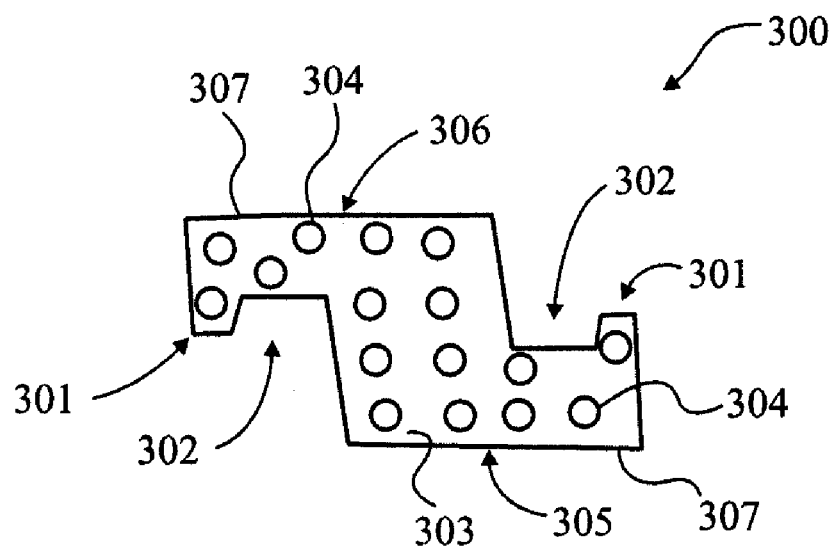
FIG. 3 illustrates a cross section of tape used to form an armour layer.

FIG. 3 illustrates a cross section of a tape formed by a pultrusion manufacturing process according to an embodiment of the present invention. As illustrated in FIG. 3 the cross section of the tape has a generally Z-shape including two nub regions 301 and two valley regions 302. The cross section thus has a generally convex and concave portion so that a convex portion of one winding can nest in a concave portion of an adjacent winding to thereby interlock adjacent windings. The tape 300 is formed from a matrix material 303 formed about reinforcement fibres 304 which extend longitudinally through the tape. The reinforcement fibres 304 illustrated in FIG. 3 are approximately uniformly distributed and the position of these reinforcement fibres in the tape is determined during the manufacturing process by virtue of one or more guide plates as will be described hereinafter in more detail. The tape has a lower surface 305 and upper surface 306. Each surface includes a shoulder region 307 where the surface is inclined inwardly with respect to a remainder of the surface.

It will be appreciated that whilst embodiments of the present invention are described here with respect to a Z-shaped cross section other type of cross section profiles which can interlock can be utilised for the pressure armour layers. It will also be appreciated that embodiments of the present invention may also or alternatively be used to provide tensile armour layers. In tensile armour layer applications it will be appreciated that the adjacent windings do not need to interlock and so a wider variety of cross section can be used.

Figure 4:
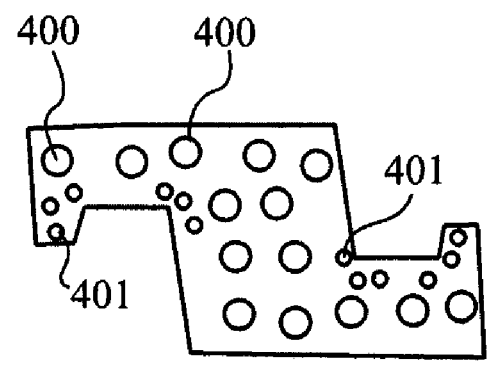
FIG. 4 illustrates a cross section of tape in which reinforcement fibres have a non uniform distribution.

FIG. 4 illustrates a cross section of a tape which may be wound to form an armour layer in accordance with an alternative embodiment of the present invention. In this embodiment the cross sectional size of the reinforcement fibres are different. Some fibres 400 have a relatively large diameter whilst some further fibres 401 have a smaller cross section. It is to be noted that clusters of fibres may be concentrated in selected regions such as regions where high loading stress is to be expected. It will be appreciated that by providing reinforcing fibres having a different cross section at different locations the performance of the tape can be somewhat controlled. For example smaller diameter fibres can be clustered close to an outer surface of the tape around the nub and valley regions. This helps prevent nubs breaking off during use when substantial forces may be experienced when adjacent windings in the armour layer are interlocked.

It will also be appreciated that in addition to or as an alternative to selecting reinforcement fibres with differing cross sections the material of which the fibres are manufactured may be different. The fibres themselves may be of a large variety of material such as metal fibres, aramid fibres and/or glass fibres. Utilising for example small diameter aramid fibres at key locations may provide a good compromise between overall cost and armour layer strength and performance.

Figure 5:
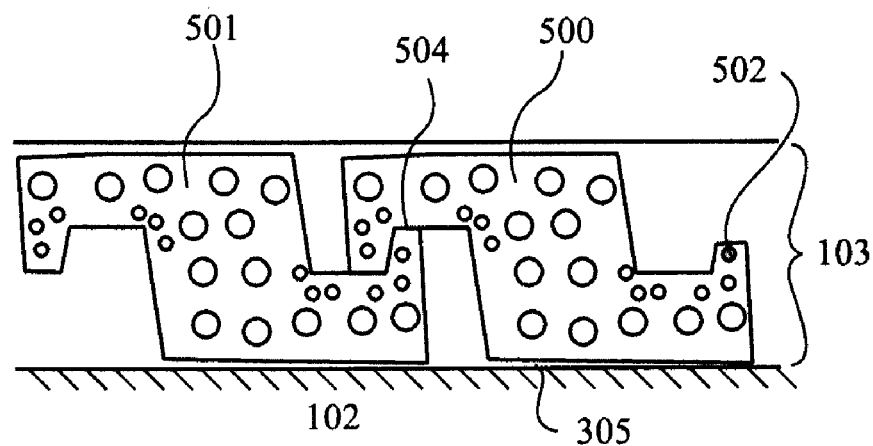
FIG. 5 illustrates adjacent windings in an armour layer in an interlocked fashion.

FIG. 5 illustrates adjacent windings of a pressure armour layer 103 in a flexible pipe body. A radially inner surface 305 of the tape lies close to and aptly in contact with the internal pressure sheath 102. A nub of a convex portion of the rightmost winding 500 is illustrated nesting in a concave portion of the left-hand side most adjacent winding. By way of example a reinforcement fibre 502 of the wound tape is illustrated in FIG. 5 as having an elliptical cross section. It will be appreciated that the cross sectional shape as well as diameter/size of reinforcement fibres can be selected according to embodiments of the present invention.

The contact region 504 between adjacent windings may be fused together in accordance with embodiments of the present invention. This is achieved during manufacturing of the armour layer 103 by providing localised heating such as by induction heating at regions where the adjacent windings interlock. Aptly a fusion bonding/welding process may be alternatively or additionally utilised to fuse windings together. The heat is raised above a predetermined temperature so that the matrix material in the windings fuses together. Heating may occur past a material softening point or melting point. If the softening point is utilised pressure may be applied to aid the fusing process. By fusing the matrix material of adjacent windings together adjacent windings effectively become integrally formed. This produces a strong armour layer which helps reduce the likelihood of burst-through of the underlying fluid retaining layer 102 between gaps in the armour layer.

It will be appreciated that rather than fusing adjacent windings together adhesives may be utilised to thereby bond portions of windings together.

Figure 6:
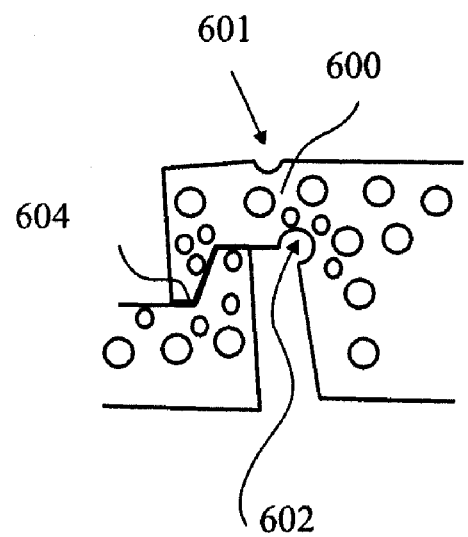
FIG. 6 illustrates a narrowed neck region and how nubs of adjacent windings fit into adjacent valleys.

It will be appreciated by those skilled in the art that if adjacent windings are fused together the flexibility of the layer will be reduced which may impede the flexibility of the overall flexible pipe. In order to overcome such problems a narrowed neck region is provided in at least one position of the tape. An example of this is illustrated in FIG. 6. Here the narrowed neck region 600 is provided by forming an outer indent 601 and an inner indent 602. This can be achieved by selecting a mould/die shape which includes such indents or by removing part of the tape where indents are desired. The narrowed neck region 600 thus acts as a hinge mechanism permitting the flexible pipe to flex in two directions. It will be appreciated that the narrow neck region may be formed according to a wide variety of options. For example rather than forming indents the design of the tape may be such that the outer surfaces of the tape are inwardly inclined to a narrowed point. Equally it will be appreciated that a narrowing may be formed only in one side of the tape yet to such an extent that a hinging action is retained.

Figure 7:
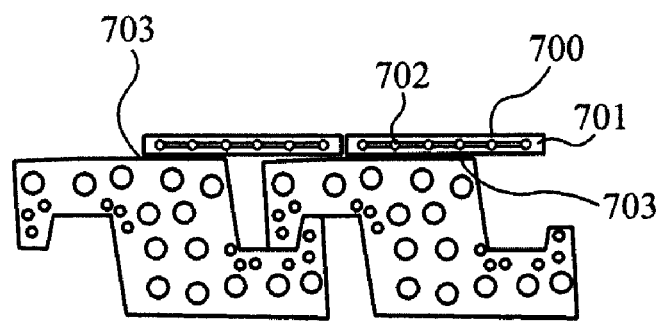
FIG. 7 illustrates interlocking windings overlaid by a composite flat tape.

FIG. 7 illustrates how a reinforcement tape 700 may be wound around an outer surface of the armour layer 103. The reinforcement tape 700 may be of a well known variety utilised by those skilled in the art so as to restrain outward movement of the windings so as to avoid the wires becoming non interlocked or (particularly in the case of tensile armour layers) moving radially outward. Aptly the reinforcement wire 700, as shown in FIG. 7, is a composite tape having a substantially flat profile. The tape includes a matrix material 701 with reinforcement fibres 702 extending longitudinally there along. The winding of the tape layer 700 may be formed from a matrix material 701 which matches the matrix material 303 of the armour tape. If utilised polymer matching of the matrix materials means that the armour tape layer can be fused to the reinforcement tape layer at selected regions 703. Aptly the whole of the outer surface of the armour layer tape is fused to the outer reinforcement tape layer except for at shoulder regions of the armour layer tape where the tape bears away from the reinforcement tape 700.

Figure 8:
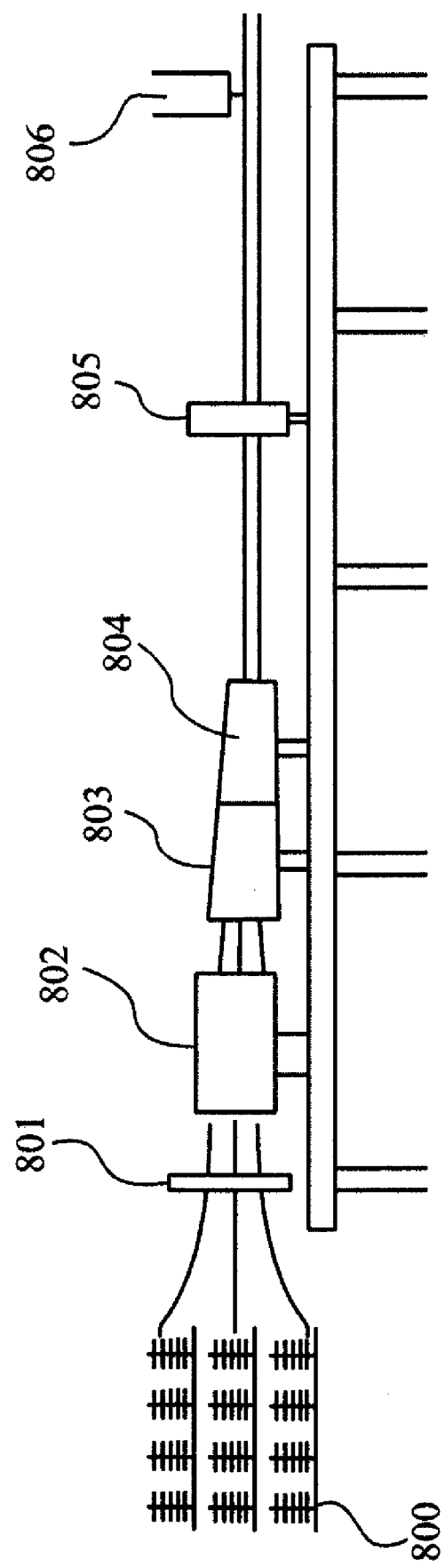
FIG. 8 illustrates a manufacturing node.

FIG. 8 illustrates a pultrusion manufacturing process for producing composite tape for forming an armour layer or reinforcement tape layer according to embodiments of the present invention. Bobbins 800 are loaded with reels of reinforcement fibres having a desired cross section/size/shape or material. The process is a pultrusion process which involves drawing the fibre from the left hand side of FIG. 8 to the right hand side of FIG. 8. The fibres are located at desired locations by a guide plate 801 which helps locate the fibres at desired locations in the end product. A resin impregnator 802 holds a liquid resin mixture (which may ophonally contain resin, fillers, 4pigment or specialised additives). The fibres are pulled through the liquid resin material and then through a heated pre former stage 803. The resin impregnator saturates the reinforcement fibres with a solution. The interior of the resin impregnator may be carefully designed to optimise the 'wet-out' process of the reinforcement so as to achieve complete or close to complete saturation of the fibres.

On exiting the resin impregnator the reinforcement fibres may again be organised and positioned for eventual placement within the cross section. The pre-form a 803 is an array of tooling which squeezes excess resin as the product moves so as to begin shaping the materials prior to entering the dye.

A die 804 having a predetermined shape is heated so as to activate a thermo-setting reaction and to cure the composite. On exiting the cured profile is pulled by a pulling system 805 and may be cut at predetermined lengths by a cutter 806. It will be appreciated that various types of heating mechanism can be utilised during the pultrusion process and that various cooling stages may be used to cool the product as will be appreciated by those skilled in the art.

Embodiments of the present invention also relate to the manufacture of flexible pipe body and of a flexible pipe utilising a portion of such flexible pipe body. During manufacture an internal pressure sheath such as a barrier layer or liner is provided at a manufacturing node and then composite tape as above-described is wound helically around the pressure sheath. As the tape is wound adjacent windings are interlocked so as to form a pressure armour layer. At the manufacturing node heating elements such as induction or fusion heating elements (not shown) may be included to provide localised heating to fuse parts of adjacent windings together.

An inner carcass may be formed within the internal pressure sheath for rough-bore application, the pressure sheath thus forming a barrier layer.

Optionally a further composite tape layer may be wrapped around the interlocked pressure armour layer. This further reinforcement tape layer may have the same or a different cross sectional profile and aptly may be a substantially flat strip having a matrix material polymer matching the matrix material of the armour layer. Heating elements may again be located to provide localised heating to fuse parts of the reinforcement tape to the underlying windings.

Outer layers such as tensile armour layers, insulating layers and an outer sheath layer may be thereafter formed.

In accordance with particular embodiments in addition to or as an alternative to provide the pressure armour layer as a wound tape of composite material one or more tensile armour layers may be formed by winding tape of a composite material in a manner coaxial with the internal pressure sheath. The cross section of the tensile armour layer may be interlocked but aptly will have a simple rectangular or circular cross section. Portions of adjacent windings may be fused or bonded together.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. Flexible pipe body for a flexible pipe, comprising:
   an internal pressure sheath; and
   at least one armour layer over the sheath comprising a wound tape of composite material,
   wherein said tape comprises a plurality of reinforcement fibres concentrated in areas of the tape which correspond to regions of high stress in the armour layer.

2. The flexible pipe body as claimed in claim 1, wherein said tape comprises a pultruded body portion containing said plurality of reinforcement fibres.

3. The pipe body as claimed in claim 2, wherein each reinforcement fibre extends in a substantially longitudinal direction along the tape.

4. The flexible pipe body as claimed in claim 2, wherein the reinforcement fibres are distributed substantially uniformly across a cross section of the tape.

5. Flexible pipe body for a flexible pipe, comprising:
   an internal pressure sheath; and
   at least one armour layer over the sheath comprising a wound tape of composite material, said tape comprising a plurality of reinforcement fibres;
   wherein a plurality of the reinforcement fibres have a predetermined diameter and a further plurality of the reinforcement fibres have a further predetermined diameter less than the predetermined diameter.

6. Flexible pipe body for a flexible pipe, comprising:
   an internal pressure sheath; and
   at least one armour layer over the sheath comprising a wound tape of composite material, said tape comprising a plurality of reinforcement fibres;
   wherein a plurality of the reinforcement fibres have a predetermined shape and a further plurality of reinforcement fibres have a further predetermined shape different from the predetermined shape.

7. Flexible pipe body for a flexible pipe, comprising:
   an internal pressure sheath; and
   at least one armour layer over the sheath comprising a wound tape of composite material, said tape comprising a plurality of reinforcement fibres;
   wherein a plurality of the reinforcement fibres are of a first material and a further plurality of reinforcement fibres are of a further material different from the first material.

8. The flexible pipe body as claimed in claim 1, wherein adjacent windings of the tape in the armour layer are interlocked.

9. The flexible pipe body as claimed in claim 8, wherein at least one nub region of each winding interlocks with a respective valley region of an adjacent winding of the armour layer.

10. Flexible pipe body for a flexible pipe, comprising:
    an internal pressure sheath; and
    at least one armour layer over the sheath comprising a wound tape of composite material;
    wherein respective portions of adjacent windings of the tape in the armour layer are fused together.

11. The flexible pipe body as claimed in claim 10, wherein at least one region of the tape includes a narrowed neck region in the tape cross section which provides a narrowing of the cross section relative to a proximate region.

12. The flexible pipe body as claimed in claim 11, wherein the narrowed neck region comprises a region of the tape between inwardly extending indents on an inner and outer surface of the tape.

13. The flexible pipe body as claimed in claim 1, further comprising:
a reinforcement tape layer wound over the armour layer.

14. Flexible pipe body for a flexible pipe, comprising:
an internal pressure sheath;
at least one armour layer over the sheath comprising a wound tape of composite material;
a reinforcement tape layer wound over the armour layer;
wherein portions of the windings of the reinforcement tape layer are fused to respective portions of an outer surface of the tape of the armour layer.

15. The flexible pipe body as claimed in claim 14, wherein the fused reinforcement tape is fused to a whole top surface of an underlying armour layer except at shoulder regions of the armour tape.

16. The flexible pipe body as claimed in claim 13, wherein:
the reinforcement tape comprises a composite tape including a plurality of reinforcement fibres in a pultruded body portion.

17. The flexible pipe body as claimed in claim 16, wherein a polymer of the composite tape of the armour layer matches a polymer of the composite tape of the reinforcement layer.

18. The flexible pipe body as claimed in claim 1, wherein the tape of the armour layer has a substantially Z-shaped cross section.

19. The flexible pipe body as claimed in claim 1, wherein the tape of the armour layer has a substantially U-shaped or S-shaped or T-shaped or I-shaped cross section.

20. The flexible pipe body as claimed in claim 1, wherein said internal pressure sheath comprises a barrier layer or a liner.

21. A flexible pipe comprising the flexible pipe body as claimed in claim 1, further comprising:
two end fittings each located at a respective one of two ends of the pipe body, the armour layer comprising a substantially continuous layer extending between the end fittings.

22. A riser, jumpline or flowline comprising the flexible pipe as claimed in claim 21.

* * * * *